April 2, 1929.  C. PFAFF ET AL  1,707,414
FUSE
Filed May 26, 1926
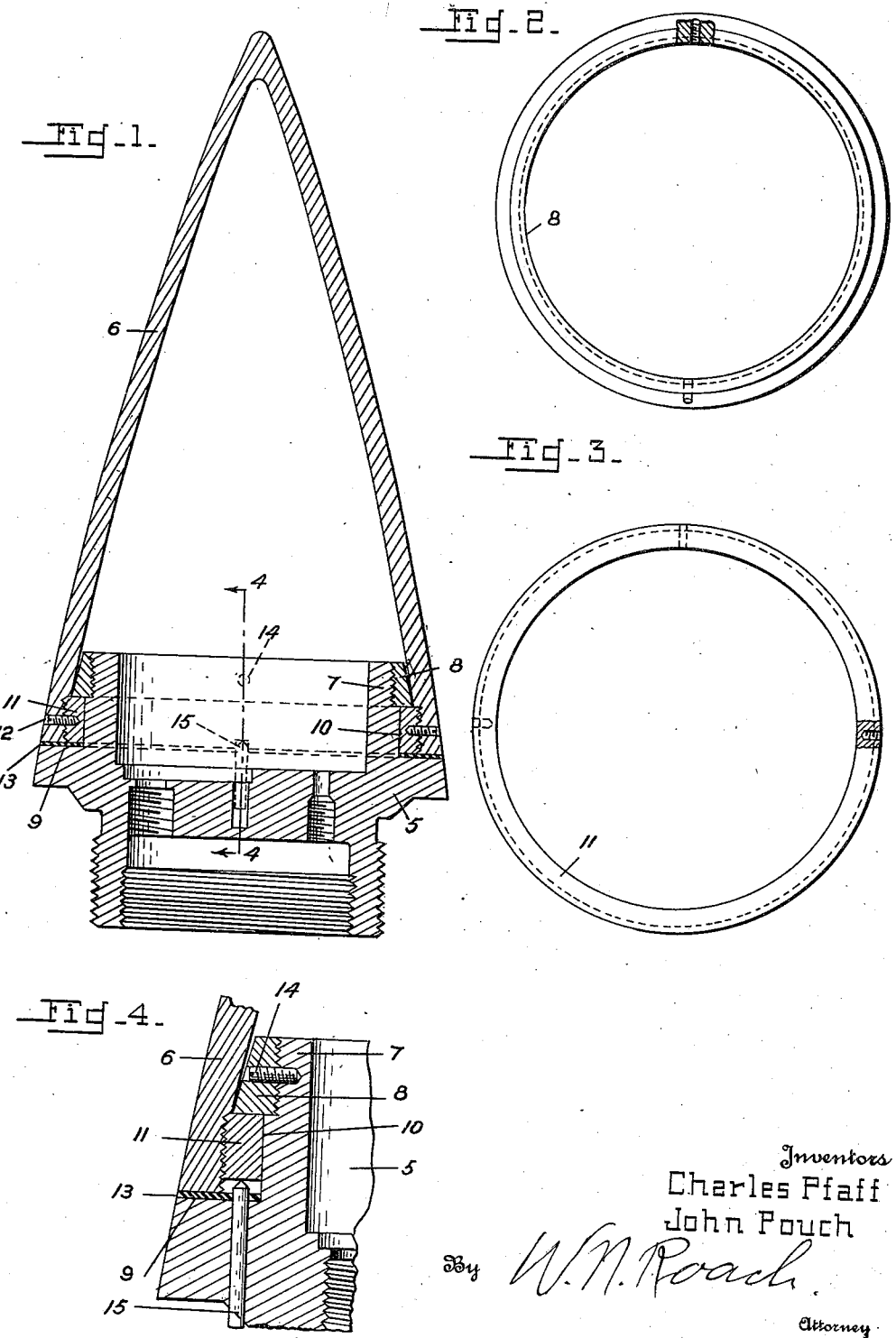
Inventors
Charles Pfaff
John Pouch
By W. N. Roach
Attorney Patented Apr. 2, 1929.

1,707,414

UNITED STATES PATENT OFFICE.

CHARLES PFAFF AND JOHN POUCH, OF PHILADELPHIA, PENNSYLVANIA.

FUSE.

Application filed May 26, 1926. Serial No. 111,894.

(GRANTED UNDER THE ACT OF MARCH 3, 1883, AS AMENDED APRIL 30, 1928; 370 O. G. 757.)

The invention described herein may be manufactured and used by or for the Government for governmental purposes without the payment to us of any royalty thereon.

This invention relates in general to a fuse and more particularly it has reference to means for removably connecting the base and setting cap of a mechanical time fuse.

In fuses wherein the cap is rotatable with respect to the base it has been the usual practice to connect these units by some form of locking ring disposed in registering grooves. Such an arrangement has the disadvantage that inspection can not be made of the fuse mechanism without destroying the cap and possibly disarranging the elements or the adjustment of the mechanism.

In the present invention we propose a simple and very effective connection or fastening by means of which the cap may be quickly applied and easily removed from the base.

To these and other ends, our invention consists in the construction, arrangement and combination of elements, described hereinafter and pointed out in the claims forming a part of this specification.

A practical embodiment of the invention is illustrated in the accompanying drawings, wherein:

Fig. 1 is a longitudinal sectional view through a fuse housing whose units are held in assembly by the improved connecting means;

Figs. 2 and 3 are plan views of the friction ring and friction locking ring;

Fig. 4 is an enlarged fragmentary sectional view through the connection on the line 4—4 of Fig. 1.

Referring to the drawings by numerals of reference:

The fuse housing may be of any type comprising a base 5 and a rotatable setting cap 6. The upper end 7 of the base is reduced and threaded to receive an externally tapered retaining ring 8, which, when in place, cooperates with an annular flange 9 constituting a seat, to form a groove 10 for confining a locking ring 11. This locking ring is externally threaded for attachment of the setting cap 6 which is fixed by means of one or more set screws 12. Interposed between the seat 9 and the cap and locking ring is a flexible washer 13 serving its usual purpose to provide sufficient frictional contact against too easy rotation of the setting cap. In this connection it will be noted that the retaining ring 8 may be utilized for the same purpose by increasing its pressure on the locking ring during the assembling of the housing. This provision eliminates the exact dimensioning which it is necessary to secure when employing a fixed groove and an expanding locking ring. Friction may also be set up between the tapered face of the retaining ring and the inner surface of the setting cap and the degree thereof and the area of the engaging surfaces may be varied to meet requirements. In order to prevent turning of the retaining ring during adjustment of the setting cap it is fixed by means of set screws 14. In assembling the housing, the lock ring 11 and friction ring 8 are successively mounted on the base, the setting cap then threaded to the lock ring which is held against rotation by a removable pin 15 and the set screws 12 inserted so that the two members thus held together may be rotated as a unit. In disconnecting the setting cap the procedure is reversed.

We claim:

1. In a fuse housing, a base formed with a seat and a reduced threaded end, a rotatable setting cap for the base, a locking ring mounted on the seat and threadedly connected to the setting cap, means for preventing relative rotation of said ring and cap, a retaining ring on the reduced threaded end of the base for confining the locking ring, said retaining ring formed with a tapered external face to frictionally contact the setting cap, means for fixing the retaining ring to the base end and a flexible washer interposed between the seat and the setting cap and locking ring.

2. In a fuse housing, a base formed with a seat and a reduced threaded end, a rotatable setting cap for the base, a locking ring mounted on the seat and threadedly connected to the setting cap, means for preventing relative rotation of said ring and cap, a retaining ring on the reduced threaded end of the base for confining the locking ring, said retaining ring formed with a tapered external face to frictionally contact the setting cap and means for fixing the retaining ring to the base.

3. In a fuse housing, a base formed with a seat and a reduced threaded end, a rotatable setting cap for the base, a locking ring mounted on the seat and threadedly connected to the setting cap, means for preventing relative rotation of said ring and cap, a retaining ring on the reduced threaded end of the base for confining the locking ring, and means for fixing the retaining ring to the base.

4. In a fuse housing, a base, a rotatable cap for the base, a locking ring removably connected to the cap and longitudinally movable retaining means frictionally engaging both the cap and locking ring.

5. In a fuse housing, a base, a rotatable cap for the base, a locking ring removably connected to the cap and longitudinally movable means for retaining the locking ring, said means being in frictional contact with the cap.

CHARLES PFAFF.
JOHN POUCH.